United States Patent [19]

Takahashi

[11] Patent Number: 4,908,753
[45] Date of Patent: Mar. 13, 1990

[54] HIGH-TENSION POWER SUPPLY FOR AN IMAGE RECORDER
[75] Inventor: Tsunehide Takahashi, Tokyo, Japan
[73] Assignee: Ricoh Company, Ltd., Tokyo, Japan
[21] Appl. No.: 321,266
[22] Filed: Mar. 9, 1989
[30] Foreign Application Priority Data
   Mar. 9, 1988 [JP] Japan .................. 63-53733
[51] Int. Cl.[4] .......................................... H02M 3/335
[52] U.S. Cl. ...................................... 363/21; 363/56; 363/97
[58] Field of Search ..................... 363/18–21, 363/56, 95, 97, 126

[56] References Cited
U.S. PATENT DOCUMENTS
4,027,240 5/1977 Meade .................................. 363/127
4,612,610 9/1986 Farnsworth et al. ................. 363/21

Primary Examiner—Peter S. Wong
Attorney, Agent, or Firm—Oblon, Spivak, McClelland, Maier & Neustadt

[57] ABSTRACT

A high-tension power supply applicable to an electro-photographic image recorder switches a DC voltage, boosts the switched DC voltage by a transformer, and outputs a high DC or AC voltage through a high-voltage side and a low-voltage side terminal which are connected to a secondary winding of the transformer. A diode or diodes are connected between the low-voltage side terminal and a ground terminal. An ammeter may be connected between the low-voltage side and ground terminals to measure an output current of the power supply.

3 Claims, 5 Drawing Sheets

HIGH-TENSION POWER SUPPLY FOR AN IMAGE RECORDER

BACKGROUND OF THE INVENTION

The present invention relates to a high-tension power supply for an image recorder of the type adopting an electrophotographic procedure and, more particularly, to a high-tension power supply which allows its output current to be readily measured.

In a copier, facsimile apparatus, laser printer or similar electrophotographic image recorder, independent high-tension power supplies are installed for individually applying high voltages to various units which execute an electrophotographic procedure in cooperation. Typical of such high-tension power supplies are a power supply associated with a main charger for uniformly charging the surface of an image carrier in the form of a photoconductive element, a power supply associated with a transfer charger for transferring a toner image produced on the photoconductive element to a paper sheet by development, and a power supply associated with a discharger for dissipating a charge which remains on the photoconductive element after the image transfer. These power supplies are built in the image recorder at the production stage and then delivered with their outputs adjusted individually. Further, the outputs of the power supplies are checked at predetermined intervals while the image recorder is in use.

It has been customary to check the output of each high-tension power supply in terms of current by connecting an ammeter to the high voltage output side of the power supply. This kind of measurement has a drawback that the high voltage directly applied to the ammeter may cause an electric shock or damage the ammeter. Further, the high voltage brings about a substantial leak current which is apt to introduce errors in the measurement. Especially, concerning a high AC voltage, the loss due to distributed capacity is so great that the measurement is effected by the arrangement of leads and the location of an ammeter. The measurement should therefore be performed by determining minute conditions for measurement. Thus, the operation for checking the outputs of high-tension power supplies heretofore performed is extremely troublesome.

SUMMARY OF THE INVENTION

It is therefore an object of the present invention to provide a high-tension power supply for an image recorder which allows its output current to be measured easily and, yet, accurately without resorting to a complicated construction.

It is another object of the present invention to provide a generally improved high-tension power supply for an image recorder.

A high-tension power supply supplied with a DC voltage for outputting a high DC voltage or a high AC voltage of the present invention comprises switching means for switching the supplied DC voltage, a transformer for boosting the switched voltage, terminal means having a high-voltage side output terminal, a low-voltage side output terminal, and a ground terminal which are connected to a secondary winding of the transformer, and a diode or diodes connected between the low-voltage side terminal and the ground terminal. The low-voltage side terminal and ground terminal are accessible from the outside to connect an ammeter.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
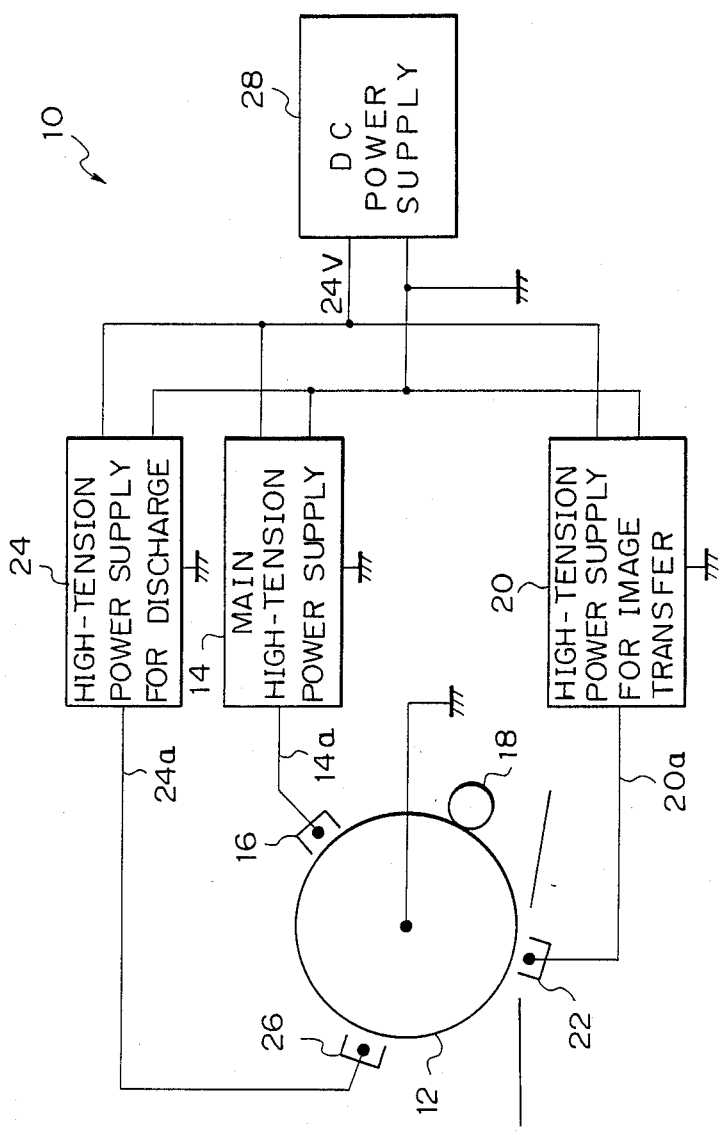
FIG. 1 is a schematic diagram showing an electrical arrangement of an electrophotographic image recorder.

Referring to FIG. 1 of the drawings, electrical wirings of a copier or similar image recorder in which a different high-tension power supply is assigned to each unit for executing a photographic procedure are shown. The copier 10, generally 10, includes a photoconductive element in the form of a drum 12 and a main high-tension power supply 14. The output 14a of the main power supply 14 is fed to a main charger 16 which uniformly charges the surface of the drum 12 to a predetermined potential. The charged surface of the drum 12 is exposed imagewise to form an electrostatic latent image representative of a desired image thereon. A developing unit 18 develops the latent image to convert it into a toner image. A high-tension power supply 20 adapted for image transfer applies its output 20a to a developing unit 18, whereby the toner image is transferred to paper sheet. Further, a high-tension power supply 24 applies its output 24a to a discharger 26 causing the latter to reduce the potential remaining on the drum 12 after the image transfer to a zero level. The above-described sequence of steps may be repeated to produce recordings. The high-tension power supplies 14, 20 and 24 are individually fed from a DC power supply 28. The high-tension power supplies 14, 20 and 24 have their outputs adjusted individually after being built in the copier 10 at the production stage. Even when the copier 10 is operated by a user, the outputs of such high-tension power supplies are checked periodically.

Heretofore, the outputs of the high-tension power supplies 14, 20 and 24 have been measured individually in terms of current by connecting an ammeter to the high voltage output side of each power supply. This kind of measurement has a drawback that the high voltage directly applied to the ammeter may cause an electric shock or damage the ammeter. Further, the high voltage brings about a substantial leak current which is apt to introduce errors in the measurement. Especially, concerning a high AC voltage, the loss due to distributed capacity is so great that the measurement is effected by the arrangement of leads and the location of an ammeter. The measurement should therefore be performed by determining minute conditions for measurement.

Figure 2:
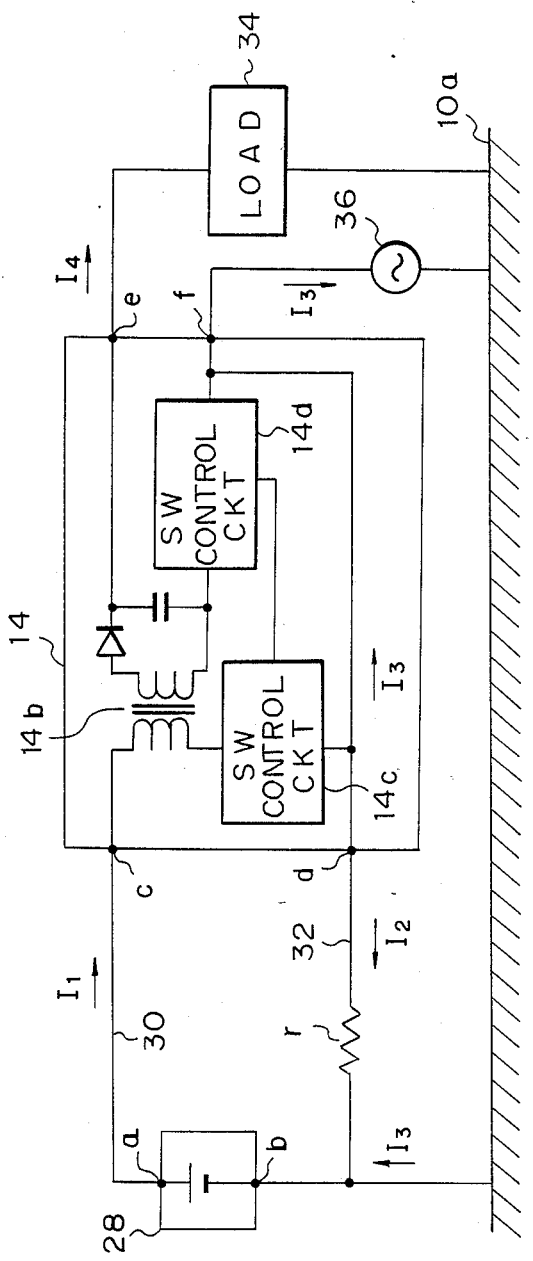
FIG. 2 is a circuit diagram showing a prior art high-tension power supply and how its output current is measured.

FIG. 2 illustrates a conventional method for measuring the output current of a high-tension power supply which is implemented by an ammeter. The high-tension power supply 14, for example, has terminals c and d which are connected to terminals a and b of the DC power supply 28 by leads 30 and 32, respectively. The lead 32 is provided with a resistor r. The output terminal b of the DC power supply 28 which is connected to ground is connected to a metallic frame 10a of the copier 10. One output terminal e of the high-tension power supply 14 is connected to the metallic frame 10a via a load 34, while the other output terminal f is connected to the frame 10a via an ammeter 36. A current $I_1$ fed from the DC power supply 28 to the high-tension power supply 14 flows through a primary winding of a transformer 14b and a switch control circuit 14c of the power supply 14 and then returns to the DC power supply 28. More specifically, the current $I_1$ fed from the high-tension power supply 14 sets up a loop of a current $I_2$ which flows through the primary winding of the transformer 14b, the switch control circuit 14c, the lead 32 and the output terminal b of the DC power supply 28 in this order. Due to the resistor r, another loop is formed by a current $I_3$ which flows through a secondary winding of the transformer 14b, the switch control circuit 14d, output terminal f, ammeter 36, metallic frame 10a, and the ground output terminal b of the DC power supply 28. In this condition, a current $I_4$ flowing toward the load 34 and the current $I_3$ returning to the DC power supply 28 are caused to flow through the ammeter 36, preventing the true value of the current through the load 34 from being measured. Although the ground output terminal b of the DC power supply 28 may of course be electrically insulated from the metallic frame 10a, isolating the DC power supply 28 from ground is extremely difficult and impractical. It is necessary to ground the DC power supply 28 via the metallic frame 10a for enhancing safety operations and insuring resistance to noise. Further, the loop has to be interrupted at both of the high voltage side and the ground side in order to accommodate the ammeter 36.

Figure 3:
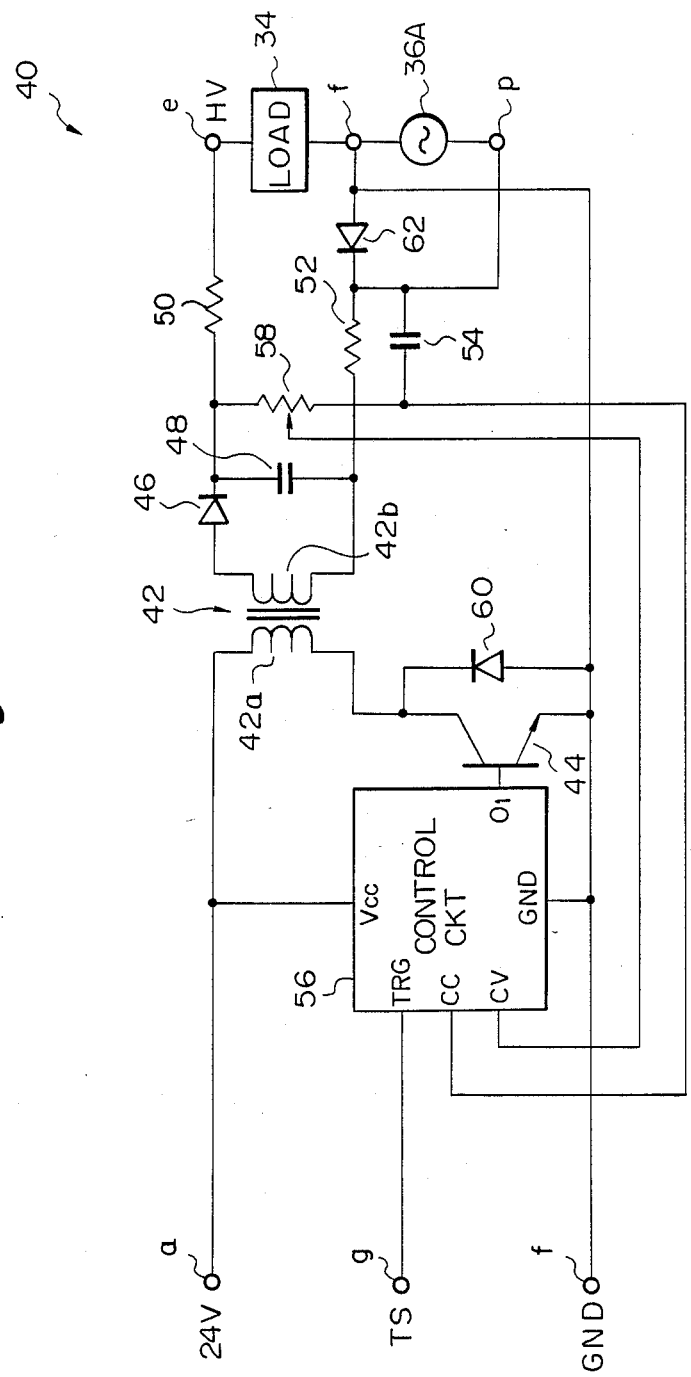
FIG. 3 is a circuit diagram of a high-tension power supply embodying the present invention.

Referring to FIG. 3, a high-tension power supply embodying the present invention is shown which may constitute the high-tension power supply 14 of FIG. 1, for example. As shown, the high-tension power supply 40 includes a transformer 42 having a primary winding 42a which is connected to the terminal a. This terminal a is connected to the DC power supply 28. A transistor 44 switches the primary winding 42a of the transformer 42. A diode 46 and a capacitor 48 rectify and smooth an output of a secondary winding 42b of the transformer 42. A DC high voltage HV is produced from the output terminal e via a resistor 50 adapted for the protection of an output. A resistor 52 and a capacitor 54 detect the output current in cooperation. The detected output current is applied to a current feedback circuit CC of a control circuit 56 to be thereby subjected to constant current control. On the other hand, a resistor 58 detects the output voltage. The detected output voltage is fed to a voltage feedback circuit CV of the control circuit 56 which is adapted for protection against overvoltage. A diode 60 is connected between the emitter and collector electrodes of the transistor 44 to absorb surge. The control circuit 56 has an input terminal TRG to which a trigger signal TS coming in through a terminal g is applied.

In the illustrative embodiment, a diode 62 is connected to the output terminal f which is connected to ground. The diode 62 is connected at one terminal to the ground terminal f and at the other terminal to a terminal p. In this configuration, a current flowing through a load 34 can be readily and accurately measured simply by connecting an ammeter 36A whose rating is smaller than the forward voltage drop of the diode 62 between the terminals f and p. More specifically, the terminals f and p of the high-tension power supply 40 serve as means for connecting the ammeter 36A to the high-tension power supply 40.

Figure 4:
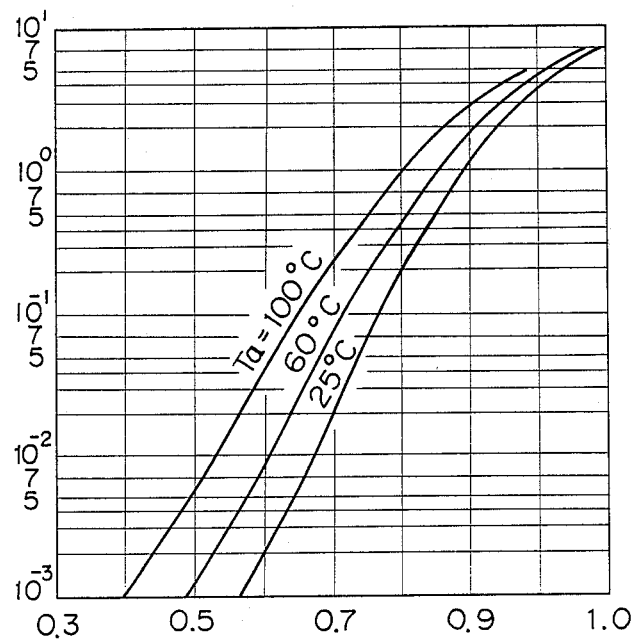
FIG. 4 is a plot representative of an electrical characteristic of a diode which is applicable to the embodiment of FIG. 3.

FIG. 4 is a plot representative of an electrical characteristic of the diode 62 and proving that a current does not flow through the diode 62 unless the forward voltage becomes higher than a predetermined level. As shown, while the forward voltage varies with the ambient temperature Ta associated with the diode 62, the temperature of actual environment of use is lower than 50° C., i.e., no current flows through the diode 62 when the forward current is lower than 0.5 V. Hence, only if the ammeter 36A whose rating is less than 0.5 V is connected to opposite terminals of the diode 62, all the currents are caused to flow through the ammeter 36A. This allows the current flowing through the load 34 to be measured with accuracy.

Figure 5:
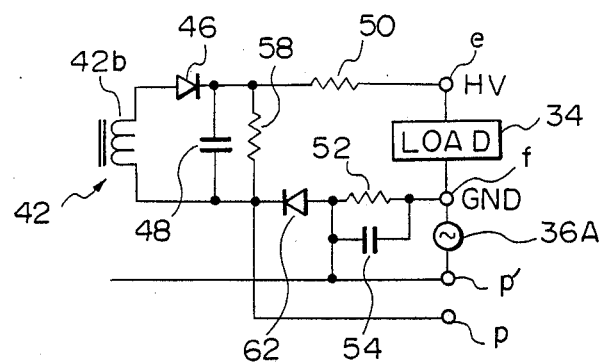
FIG. 5 is a circuit diagram showing an essential part of a modified form of the embodiment shown in FIG. 3.

A modification to the embodiment of FIG. 3 is shown in FIG. 5. As shown, the current detecting section with the diode 62, i.e., the current detecting section constituted by the resistor 52 and capacitor 54 and the diode 62 are replaced with each other so as to minimize the influence on the current detecting section. In this modification, it is impossible to use the terminal f for the connection with the ammeter and, therefore, another terminal p' is provided. The ammeter 36A may be connected to the terminal p and p' to measure a current as in the first embodiment.

Figure 6:
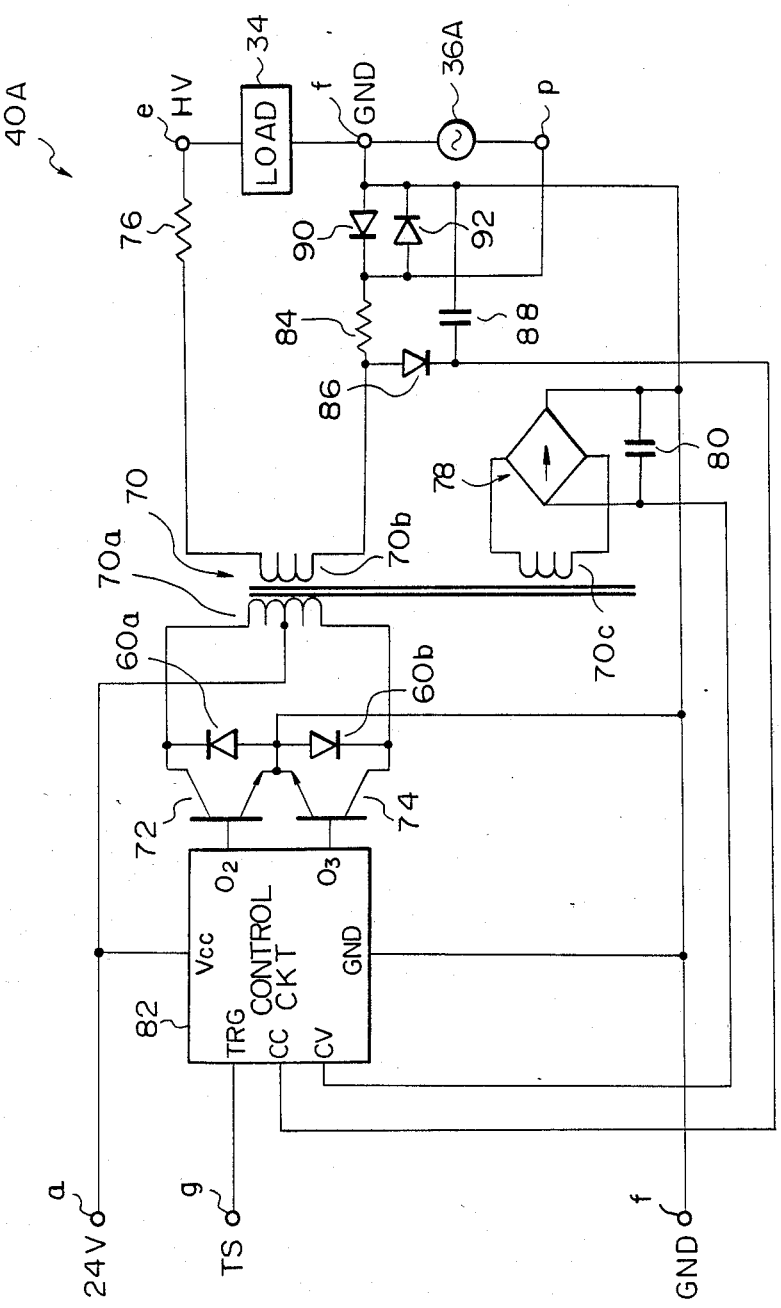
FIG. 6 is a circuit diagram showing an alternative embodiment of the present invention.

The high-tension power supply shown in any of FIGS. 3 and 6 is of course similarly applicable to the high-tension power supply 20 of FIG. 1.

Referring to FIG. 6, an alternative embodiment of the present invention which may implement the discharge high-tension power supply 24 of FIG. 1 is shown. In the figure, the same circuit elements as those shown in FIG. 3 are designated by like reference numerals. As shown, a high-tension power supply 40A includes a transformer 70 having a primary winding 70a which is connected to the terminal a. This terminal a is connected to the DC power supply. Transistors 72 and 74 alternately switch the primary winding 70a of the transformer 70, whereby an AC high voltage HV appears on the output terminal e via a secondary winding 70b of the transformer 70 via and a resistor 76. The output voltage is detected by a tertiary winding 70c and then converted into a DC voltage by a bridge 78 and a capacitor 80. The DC voltage is applied to a voltage feedback input terminal CV of a control circuit 82 to be subjected to constant voltage control. On the other hand, the output current is detected by a resistor 84 and then transformed into a DC current by a diode 86 and a capacitor 88. The DC current is fed to a current feedback input terminal CC of the control circuit 82 so as to implement protection against overcurrent. It will be noted that the operation point of the feedback input is variable to protect the constant current control against overvoltage. Diodes 60a and 60b are provided for absorbing surge. Diodes 90 and 92 are connected to the output terminal f which is connected to ground, constituting a characteristic feature of this particular embodiment. Specifically, the diodes 90 and 92 are connected to the terminals f and p so that a current flowing through the load 34 may be readily measured by simply connecting the ammeter 36A whose rating is smaller than the forward voltage drop of the diodes 90 and 92 between the terminals f and p. The high-tension power supply of FIG. 6 is exactly the same as the power supply of FIG. 3 with respect to the operation and the effect achievable therewith.

In any of the embodiments and modification discussed above, an extra operation otherwise required to remove output leads in the event of connection of an ammeter is not necessary. This eliminates the need for a special tool and enhances rapid measurement. In addition, the circuitry is prevented from being damaged due to the leads being inadvertently left disconnected. Since the measurement of an output current is effected by using opposite terminals of one or two diodes which are connected to, among output terminals, a low-voltage side output terminal, an ammeter used for the measurement is protected from damage. Furthermore, the terminals to which an ammeter may be connected are provided at opposite terminals of a diode so as to promote efficient manipulations.

Various modifications will become possible for those skilled in the art after receiving the teachings of the present disclosure without departing from the scope thereof.

What is claimed is:

1. A high-tension power supply supplied with a DC voltage for outputting a high DC voltage or a high AC voltage comprising:
    switching means for switching the supplied DC voltage;
    a transformer for boosting the switched voltage;
    terminal means having a high-voltage side output terminal, a low-voltage side output terminal, and a ground terminal which are connected to a secondary winding of said transformer; and
    diode means connected between said low-voltage side terminal and said ground terminal;
    said low-voltage side terminal and said ground terminal constituting a connection for an ammeter;
    said diode means having a forward potential higher than a potential difference of said ammeter.

2. A power supply as claimed in claim 1, wherein said diode means is connected in a forward direction of an output loop.

3. A power supply as claimed in claim 1, wherein said diode means includes 2 diodes connected in anti-parallel to provide a bidirectional pass.

* * * * *